United States Patent [19]

Paroz

[11] Patent Number: 5,717,267
[45] Date of Patent: Feb. 10, 1998

[54] DEVICE FOR THE ELECTRICAL AND MECHANICAL CONNECTION OF THE COMPONENT CONDUCTORS FOR SUPPLYING AND REMOVING THE COOLANT

[75] Inventor: José-Pierre Paroz, Yverdon-les-Bains, Switzerland

[73] Assignee: Asea Brown Boveri AG, Baden, Switzerland

[21] Appl. No.: 649,424

[22] Filed: May 16, 1996

Related U.S. Application Data

[63] Continuation of Ser. No. 307,244, Sep. 16, 1994, abandoned.

[30] Foreign Application Priority Data

Sep. 20, 1993 [CH] Switzerland ............... 2832/93

[51] Int. Cl.$^6$ ..................... H02K 9/00; H02K 3/46
[52] U.S. Cl. ..................... 310/54; 310/71; 310/59; 310/260
[58] Field of Search ..................... 310/52, 54, 260, 310/261, 59, 71, 271

[56] References Cited

U.S. PATENT DOCUMENTS

| 3,151,260 | 9/1964 | MacCracken, Jr. et al. | 310/260 X |
| 3,648,091 | 3/1972 | Kostin et al. | 310/260 |
| 3,978,359 | 8/1976 | Kultzow et al. | 310/260 |
| 3,980,910 | 9/1976 | Steinebronn et al. | 310/71 |
| 4,072,873 | 2/1978 | Nottingham | 310/71 |
| 4,151,434 | 4/1979 | Zona et al. | 310/71 |
| 4,309,636 | 1/1982 | Pollok | 310/260 |
| 4,385,254 | 5/1983 | Vakser et al. | 310/260 |
| 4,629,917 | 12/1986 | Brem | 310/59 |
| 4,982,122 | 1/1991 | Rowe et al. | 310/54 |

FOREIGN PATENT DOCUMENTS

| 0175083 | 3/1986 | European Pat. Off. |
| 1813191 | 2/1960 | Germany. |
| 1165740 | 3/1964 | Germany. |
| 475706 | 9/1975 | U.S.S.R. |

*Primary Examiner*—Mark O. Budd
*Attorney, Agent, or Firm*—Oblon, Spivak, McClelland, Maier & Neustadt, P.C.

[57] ABSTRACT

In the connecting device for the electrical and mechanical connection of component conductors and for the supply or removal of the coolant to or from the hollow conductors (5) of the stator winding bars (3) of electrical machines, the hollow conductors (5) and, optionally, the solid conductors (4) of the winding bar in the winding head are held together in a metallic component (7). This component is connected to a water chamber (2) which is in turn provided with connecting fittings (6, 11) for the supply or removal of the coolant and is surrounded by an insulating jacket (10).

Hitherto the production and assembly of said insulating jackets was very time-consuming. In order to shorten the assembly time, the insulating jacket comprises a preferably U-shaped insulating part (10) which is pushed over the metallic component (7), the water chamber (2) and the connecting fittings (6, 11) from the inside and overlaps the latter radially. Means (17, 19 and 12a, 12b) for filling the spaces between the metallic component and the U-shaped insulating part (7) and between the connecting fittings and the U-shaped insulating part are provided both in the region of the metallic component and in the region of the connecting fittings, which means also provide for a firm retention of the insulating jacket.

21 Claims, 4 Drawing Sheets

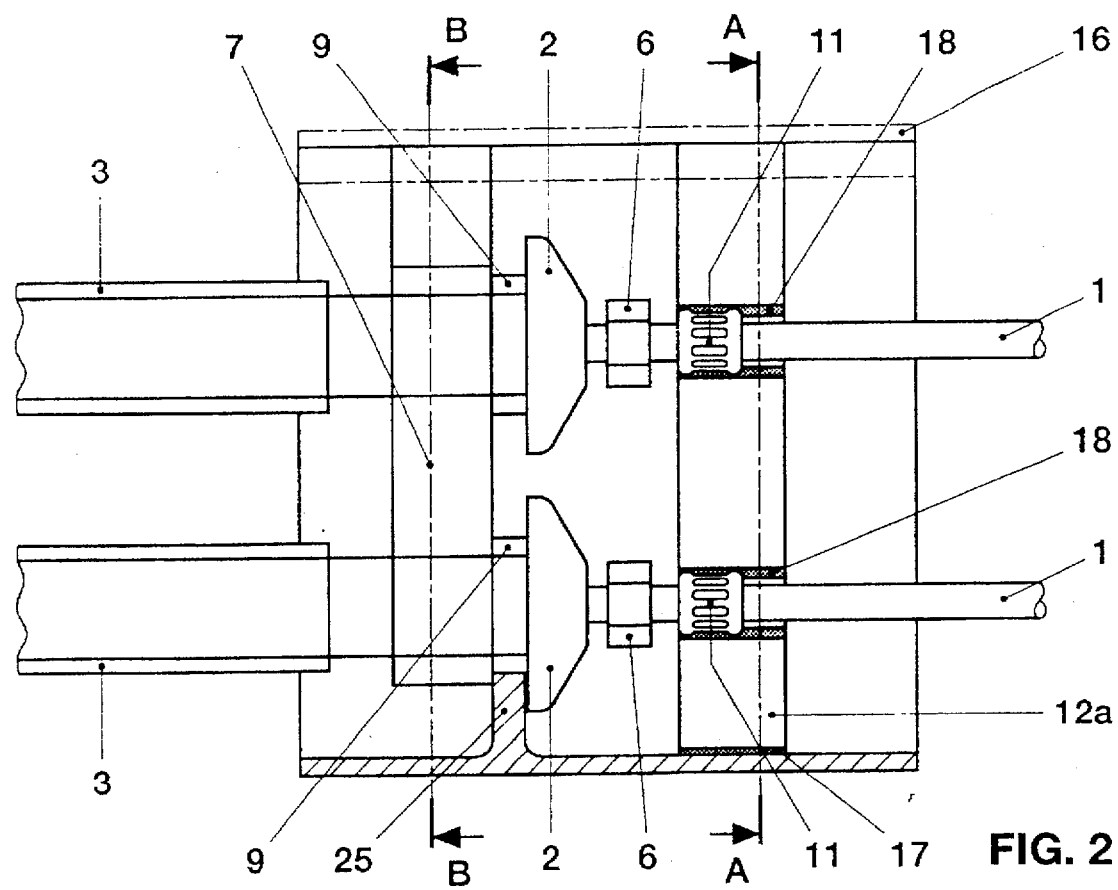
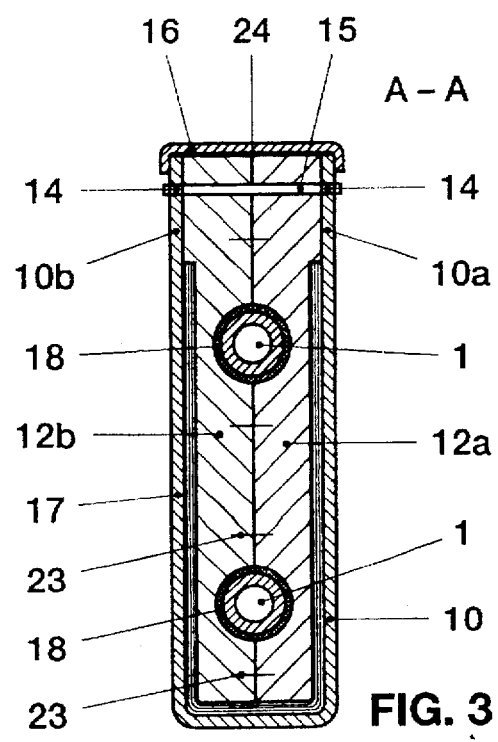
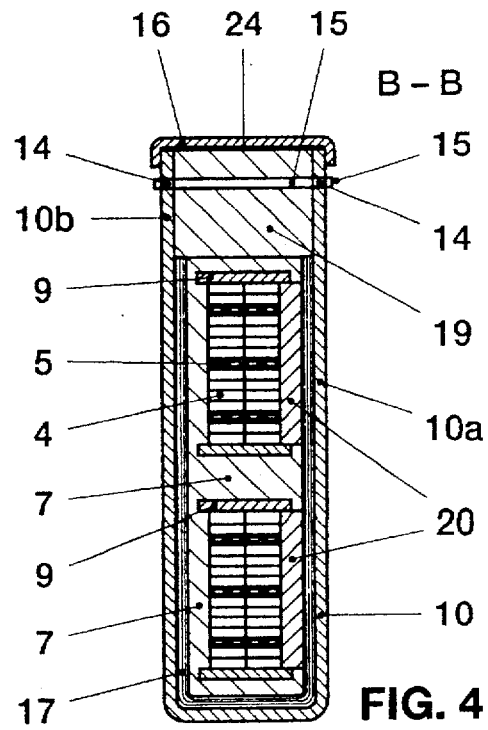

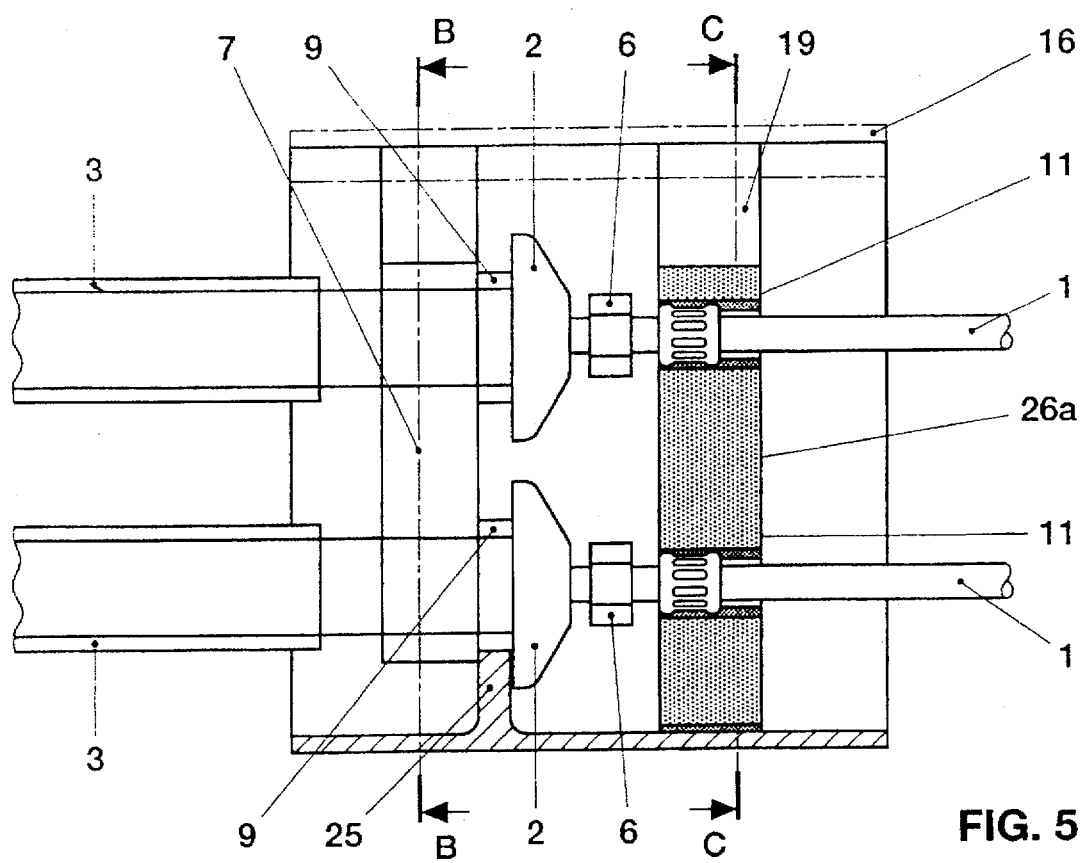
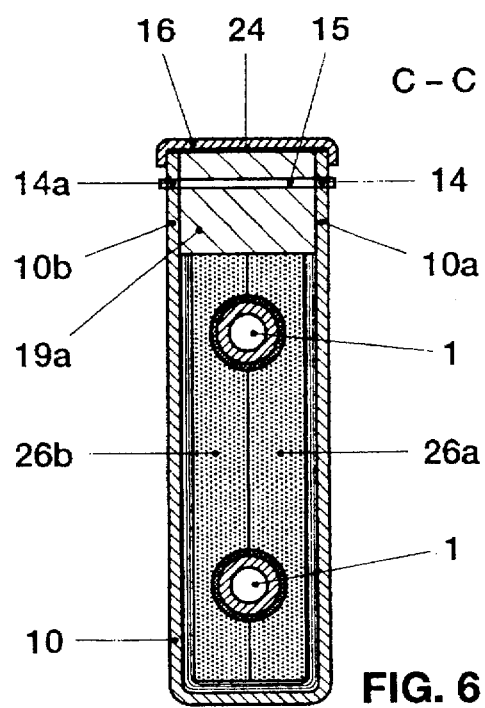
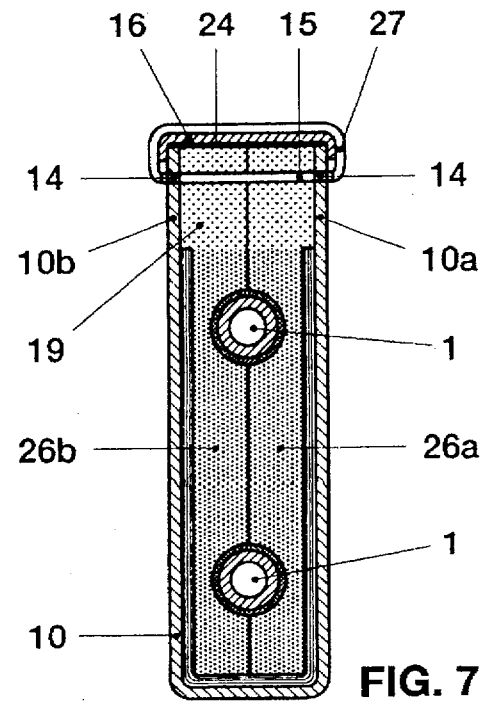

DEVICE FOR THE ELECTRICAL AND MECHANICAL CONNECTION OF THE COMPONENT CONDUCTORS FOR SUPPLYING AND REMOVING THE COOLANT

This application is a continuation of application Ser. No. 08/307,244, filed on Sep. 16, 1994, now abandoned.

BACKGROUND OF THE INVENTION

1. Field of the Invention

The invention relates to a device for the electrical and mechanical connection of the component conductors and for the supply or removal of the coolant to or from the hollow conductors of the stator winding bars of electrical machines, in which the hollow conductors and, optionally, the solid conductors of the winding bar are held together by a metallic component, which component is connected to a water chamber, and the water chamber has connecting fittings for supplying or removing the coolant, metallic component, water chamber and connecting fittings being surrounded by an insulating jacket.

A device of this type is known from the paper by K. Warnke entitled "Water-cooled turbogenerators", AEG Mitt. 52 (1962) 9/10, pages 429–438, FIG. 8 on page 433.

2. Discussion of Background

In the stator winding head of water-cooled electrical machines, the coolant is supplied by annular collecting lines via insulating hoses to the so-called water chambers at the end of the conductor bars. Said water chambers are used for the hydraulic and mechanical connection of the hollow conductors of a bar. The water chamber is mechanically connected to a metallic component which is used for the electrical connection of the hollow conductors and, optionally, of he solid conductors of the winding bar. The water chamber is furthermore provided with connecting fittings for the supply and removal of the coolant. This element consisting of metallic component, water chamber and connecting fitting is generally described as an eye. The eyes are always surrounded by insulating caps or insulating jackets at the phase separators. In addition, all the eyes are insulated in this way at the present time in order to increase the electrical safety.

The application of such insulating jackets is very time-consuming because of the complex structure of the eye, as is shown by a glance at FIG. 8 of the publication mentioned at the outset, and has to be done laboriously by hand. Generally, the insulating jackets are foam-packed subsequently using a two-component foam. For this purpose, all the gaps still present have to be sealed in order to prevent the foam escaping from the insulating jacket.

SUMMARY OF THE INVENTION

Accordingly, one object of the invention is to provide a device for the supply or removal of the coolant of the type mentioned which is economical to produce and is simple to install.

This object is achieved, according to the invention, in that the insulating jacket comprises a single-component or multicomponent insulating part which is pushed essentially from the inside over the metallic component, the water chamber and the connecting fittings and overlaps the latter radially and axially, and in that means are provided for filling the spaces between the metallic component and the insulating part or between the connecting fittings and the insulating part both in the region of the metallic component and in the region of the connecting fittings.

The advantage of the invention is to be perceived, in particular, in the fact that no components adapted to the particular installation situation are required. The foam-packing of the insulating jackets previously regarded as unavoidable is also unnecessary. This reduces installation times, which is advantageous, in particular, in retrofit projects.

Exemplary embodiments of the invention and the advantages achievable therewith are explained in greater detail below with reference to the drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows a longitudinal section through the connecting device shown in FIG. 1;

FIG. 3 shows a cross section through the connecting device as shown in FIG. 2 at the level of the connecting fittings along the line AA therein;

FIG. 4 shows a further cross section through the connecting device as shown in FIG. 2 at the level of the metallic component along the line BB therein;

FIG. 5 shows a modification of the design as shown in FIG. 3, foam material being provided as spacing means;

FIG. 6 shows a cross section through the connecting device as shown in FIG. 5 at the level of the connecting fittings along the line CC therein;

FIG. 7 shows a modification of the design shown in FIG. 6;

DESCRIPTION OF TEE PREFERRED EMBODIMENTS

Figure 1:
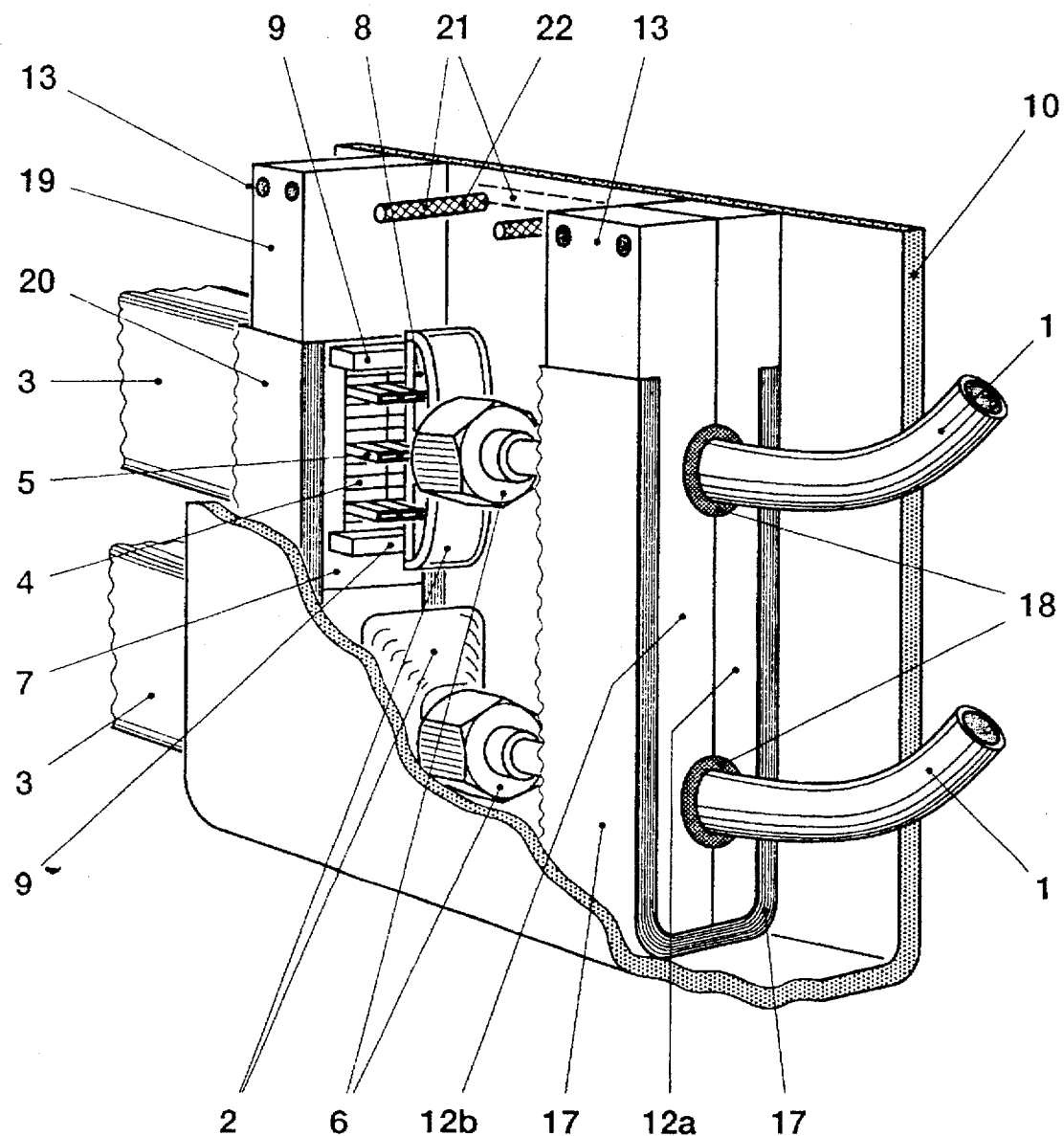
FIG. 1 shows a first exemplary embodiment of a device according to the invention in perspective view.

In the stator winding head of water-cooled electrical machines, the coolant is supplied by annular collecting lines via insulating hoses 1 to the so-called water chambers 2 at the end of the conductor bars 3. Said water chambers 2 are used for the electrical and mechanical connection of the solid component conductors 4 and the hollow component conductors 5 of a bar and for the electrical connection of various component conductors, and are provided with connecting fittings 6 for supplying and removing the coolant.

Such a water chamber is described and disclosed in U.S. Pat. No. 4,629,917. The solid component conductors 4 and the hollow component conductors 5 of the winding bar 1 are held together by a metallic component 7 which is designed as a bracket or jacket which at least partially encloses the bar ends and is connected to said bar ends. In this arrangement, only the hollow component conductors 5 project out of the metallic component. They are mounted in a liquid-tight manner in a soldering plate 8. The soldering plate 8 is attached to the end face of the metallic component 7 by means of spacers 9. Further details are to be found in the US patent specification mentioned, to which reference is expressly made here.

As a glance at FIG. 3 of said patent specification or, alternatively, at FIG. 8 in the AEG-Mitt., loco citato shows, insulating said water chambers by means of insulating caps or insulating jackets is very difficult and time-consuming. It is here that the invention is used. It is explained using the example of the water chamber disclosed in U.S. Pat. No. 4,629,917, but is, of course, not restricted to such designs.

Referring now to the drawings, wherein like reference numerals designate identical or corresponding parts throughout the several views, a U-shaped insulating part 10 with limbs 10a, 10b and base 10c is pushed radially over the connecting device comprising metallic component 7, water chamber 2 and connecting fittings from the inside (arrow in FIG. 1). The insulating part is composed of glass-fiber-reinforced plastic or of a laminate. In the axial direction, the insulating part 10 extends to above the ferrules 11 of the connecting fittings 6 at the free end of the connecting device and projects beyond the metallic component 7 of the water chamber in the direction of the stator. The insulating part 10 also projects beyond the outer water chamber in the radial direction. Provided at the level of the ferrules 11 are first spacing means. These comprise spacers 12a and 12b disposed in pairs. On their mutually adjacent surfaces, the latter are provided with semicircular, axially extending grooves into which the ferrules 11 fit. The surfaces adjacent to the limbs 10a and 10b are provided with a material recess which extends up to above the upper groove. The total thickness of the two spacers above the recess viewed in the azimuthal direction is equal to the internal width of the U-shaped insulating part 10. Azimuthally extending bores 13 in the spacers 12a and 12b are aligned with bores 14 on the outer limb ends and are used to receive fixing pins 15. The U-shaped insulating part 10 is sealed by a cover 16 on the outside (FIGS. 3 and 4).

Placed in the recess is a glass-fiber mat or a glass-fiber cushion 17 (deformable in the installed state) which is impregnated with synthetic resin and which completely fills said recess. Interlayers 18 made of synthetic-resin-impregnated glass fibers or glass-fiber cloth are also provided between the ferrules 11 or the insulating hoses 1 and the spacers 12a and 12b.

Provided at the level of the metallic component 7 are second spacing means whose arrangement is evident from the cross section shown in FIG. 4. In addition to an outer insulating block 19, these comprise filling pieces 20 between one limb 10a of the U-shaped insulating part 10 and the conductor bars. The filling pieces may be dispensed with if the metallic component 7 having an E-shaped profile in the case of the example is of symmetrical construction, for example has an H-shaped profile. The thickness of the insulating block 19 (viewed in azimuthal direction) is equal to the internal width between the limbs 10a and 10b. Analogously to the first spacing means, a glass-fiber mat or glass-fiber cushion 17 (deformable in the installed state) which completely fills the remaining space between the metallic component 7 or the filling pieces 20 and the U-shaped insulating part 10 is also inserted here.

Azimuthally extending bores 13 in the insulating block 19 are aligned with bores 14 on the outer limb ends and are used to receive fixing pins 15.

The cover 16 is attached to the U-shaped insulating part 10 by means of glass-fiber cords 21 which are passed through the bores 22 at the outer end of the limbs 10a and 10b between the first and the second spacing means.

Compared with the known arrangement, the mounting procedure is very simple:

After applying the interlayers 18, which have been impregnated beforehand with insulating resin but are not yet cured, to the ferrules 11, the spacers 12a and 12b are mounted and the cushions 17, which have also been impregnated with insulating resin but are not yet cured, are placed in the recesses. In this process, the assembly pins 23 facilitate the assembly. After the filling pieces 20 have been introduced, a cushion 17, impregnated with insulating resin but not yet cured, is likewise wrapped from the inside around the metallic part 7 at the level of the latter. The U-shaped insulating part 10 is now pushed from the inside onto the water chamber prepared in this way. After the insulating block 19 has been inserted, the structure is secured by means of the pins 15.

A guard against axial displacement during the assembly, the curing of the insulating resin or even during the subsequent operation consists in providing an inwardly projecting flange or collar 25 (FIG. 2) on the base 10c and/or on the limbs 10a, 10b of the U-shaped insulating part 10, which flange or collar 25 projects into the space between metallic component 7 and soldering plate 8 and more or less fills said space in the axial direction. Optionally, all the surfaces which are in contact with one another in the installed state, for example the parting surfaces of the two spacers 12a and 12b, the surfaces of the spacing block 19 and those of the filling pieces 20, can be coated with insulating resin. Finally, the cover 16 is mounted and fixed by means of the insulating-resin-impregnated glass cords. To prevent any vibrations, a thin glass-fiber mat impregnated with insulating resin is preferably inserted between the cover 16 and the surfaces of the spacers 12a, 12b or of the insulating block situated thereunder.

Instead of spacers 12a, 12b and the optional cushions 17, 18 in the region of the connecting fittings, pliable foam-material parts 26a, 26b, impregnated or impregnatable with insulating resin, may be used as spacers in the assembly phase, as is illustrated in FIGS. 5 and 6. Such foam materials, for example with a melamine base, are of sponge-like consistency, can be easily machined and are available up to insulation class H. For the present purpose, the foam material is cut approximately to the cross section to be filled and is mounted on the connecting fittings from both sides before the U-shaped insulating part 10 is pushed on. In this case, the impregnation with insulating resin can be carried out before the U-shaped insulating part 10 is pushed on or only after that has been done. In the latter case, the impregnation is carried out by injecting the resin from the outside.

Analogously to the spacing in the region of the metallic component 7, however, a spacing block 19a which is secured by a pin 14a can also be provided radially on the outside. The two foam-material parts 26a and 26b can, however, also extend over the entire radial height of the insulating jacket (cf. FIG. 7). preferably, the U-shaped insulating part 10 is held together and the cover 16 is fixed by glass-fiber cords 27 which are impregnated with insulating resin and which are pulled through the bores 14 and the foam-material parts 26a, 26b with a needle-type tool.

Figure 8A:
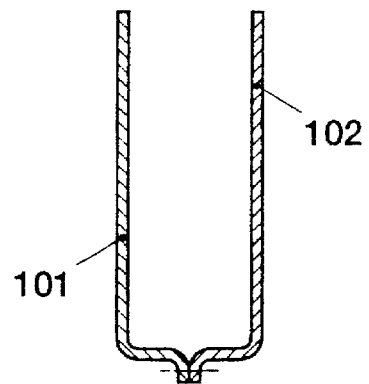
FIG. 8 shows various embodiments of multicomponent insulating parts comprising L-shaped insulating parts (FIGS. 8a, b and c) or C-shaped insulating parts (FIGS. 8d and e).

In all the designs described above, a single-component insulating part 10 having a U-shaped cross section was assumed. Without departing from the scope of the invention, however, other cross sections are also possible. FIG. 8 shows diagrammatically such alternative embodiments of the insulating part:

Thus, FIG. 8a shows an embodiment of a U-shaped insulating part which is made up of two L-shaped insulating parts 101 and 102 which are radially joined together on the inside.

Figure 8B:
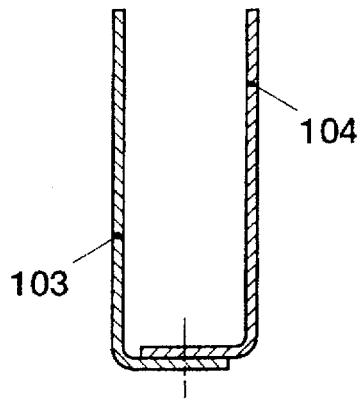

FIG. 8b shows a variant having two L-shaped insulating parts 103, 104, in which the short limbs overlap.

Figure 8C:
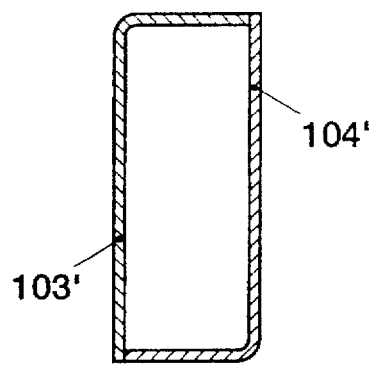

In the variant shown in FIG. 8c, L-shaped insulating parts 103', 104' are likewise used, but one short limb is fitted radially on the inside and the other short limb radially on the outside.

Figure 8D:
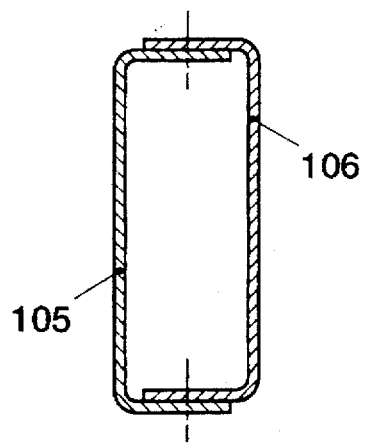
Figure 8E:
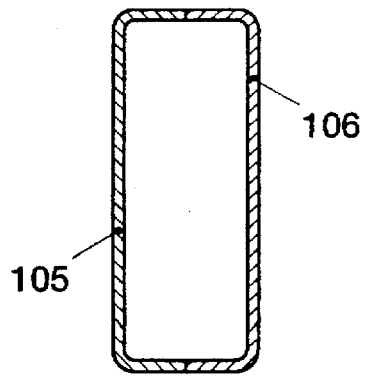

Finally, in the variant shown in FIG. 8d, C-shaped insulating parts 105, 186 are provided whose free limbs overlap radially on the inside or radially on the outside or abut one another as shown in FIG. 8e.

The two insulating parts can be held together in these cases either by pins or binding bands made of glass-fiber cords or glass-fiber slubbings impregnated with insulating resin. In addition, in the variants shown in FIGS. 8c–8e, a separate cover is not needed.

After the insulating resin has cured, the insulating jacket produced in this way is firmly connected to the metallic component 7, the water chamber 2 and the associated connecting fittings 6, 11, withstands all the operating stresses and is notable for small space requirement and few individual adaptation operations. At the same time, a particular advantage of the invention is that a foam-packing of the interior of the insulating jacket is unnecessary. This shortens the assembly time appreciably and results in shorter shutdown times in the case of retrofit projects.

The invention was described and disclosed with reference to an exemplary embodiment specifically geared to a water chamber in accordance with U.S. Pat. No. 4,629,917. It is not, however, restricted to such water-chamber geometries. As a rule, only the spacing means have to be adapted to the shape and size of the water chambers. It can also readily be applied in the case of so-called double bars.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A connecting device for the electrical and mechanical connection of hollow component conductors and for the supply or removal of a liquid coolant to or from the hollow component conductors of stator windings of electrical machines, each stator winding having a radially inside surface and a radially outside surface, in which the hollow component conductors and, optionally, the solid conductors of each winding are held together by a metallic component, which component is connected to a water chamber, and the water chamber has connecting fittings for the supply or removal of the liquid coolant, and the metallic component, the water chamber, and the connecting fittings, are surrounded by an insulating jacket, the insulating jacket comprising a single component or multiple component insulating part having long pairs of limbs which extend outwardly from the inside of each of the stator windings over the metallic component, the water chamber and the connecting fitting and overlap the latter radially and each pair of long limbs having a base which overlaps the metallic component, the water chamber, and the connecting fitting axially on the inside of a stator winding, and wherein means are provided for filling the spaces between the metallic component and the insulating part and between the connecting fittings and the insulating part both in the region of the metallic component and in the region of the connecting fittings, whereby the insulating part is adapted to be pushed into its assembled position from the inside of said stator windings after the water chamber is connected to a supply or removal line.

2. The connecting device as claimed in claim 1, wherein the insulating part is designed as a single piece and has a U-shaped cross section.

3. The connecting device as claimed in claim 1, wherein the insulating part comprises two insulating parts having an L-shaped cross section, the short limbs forming the base and being situated radially on the inside of the stator winding.

4. The connecting device of claim 2, wherein the insulating jacket furthermore comprises a cover made of insulating material which is arranged over long limbs of the insulating part from the outside of the stator windings and is attached to said long limbs, whereby said cover is adapted to be pushed into its assembled position from the outside of the stator windings.

5. The connecting device as claimed in claim 4, wherein the cover is of U-shaped design, and is arranged over the long limbs of the insulating part on the outside of the stator windings and is attached to the insulating part by means of binding bands.

6. The connecting device as claimed in claim 1, wherein the insulating part is of two-component design and comprises two C-shaped shells.

7. The connecting device as claimed in claim 1, wherein the insulating part is of two-component design and comprises two L-shaped insulating parts, their short limbs being situated in one case radially on the inside of the stator windings and forming the base and in the other case radially on the outside of the stator windings.

8. The connecting device as claimed in claim 1, wherein the spacing means are of two-component design in the region of the connecting fittings, are composed of insulating material and closely fit the connecting fittings on both sides.

9. The connecting device as claimed in claim 1, wherein the insulating part is attached by means of pins to the said spacing means.

10. The connecting device as claimed in claim 1, wherein the spacing means adjacent to the bar ends are designed as cushions or mats which are pliable in the assembly phase.

11. The connecting device as claimed in claim 10, wherein insulating blocks and filling pieces made of insulating material are additionally provided for filling the space.

12. The connecting device as claimed in claim 1, wherein cushions or slubbings which are pliable in the assembly phase and are impregnated with insulating resin are inserted between the connecting fittings and the spacing means and/or between the spacing means and the insulating part.

13. The connecting device as claimed claim 1, wherein an open-pore pliable foam material which is pliable in the assembly phase and is impregnated with insulating resin is provided as spacing means.

14. The connecting device as claimed in claim 1, wherein means are provided for axially securing the insulating part.

15. The connecting device as claimed in claim 3, wherein the insulating jacket furthermore comprises a cover made of insulating material which is arranged over the long limbs of the L-shaped insulating parts from the outside of the stator windings and is attached to said limbs, whereby said cover is adapted to be pushed into its assembled position from the outside of the stator windings.

16. The connecting device as claimed in claim 2, wherein the spacing means are of two-component design in the region of the connecting fittings, are composed of insulating material and closely fit the connecting fittings on both sides.

17. The connecting device as claimed in claim 2, wherein the insulating part is attached by means of pins to the said spacing means.

18. The connecting device as claimed in claim 2, wherein the spacing means adjacent to the bar ends are designed as cushions or mats which are pliable in the assembly phase.

19. The connecting device as claimed in claim 3, wherein the spacing means are of two-component design in the region of the connecting fittings, are composed of insulating material and closely fit the connecting fittings on both sides.

20. The connecting device as claimed in claim 3, wherein the insulating part is attached by means of pins to the said spacing means.

21. A connecting device as claimed in claim 15, wherein the cover is of U-shaped design, is arranged over the long limbs of the L-shaped parts on the outside of the stator windings and is attached to the insulating part by means of binding bands.

* * * * *